United States Patent Office 3,484,695
Patented Dec. 16, 1969

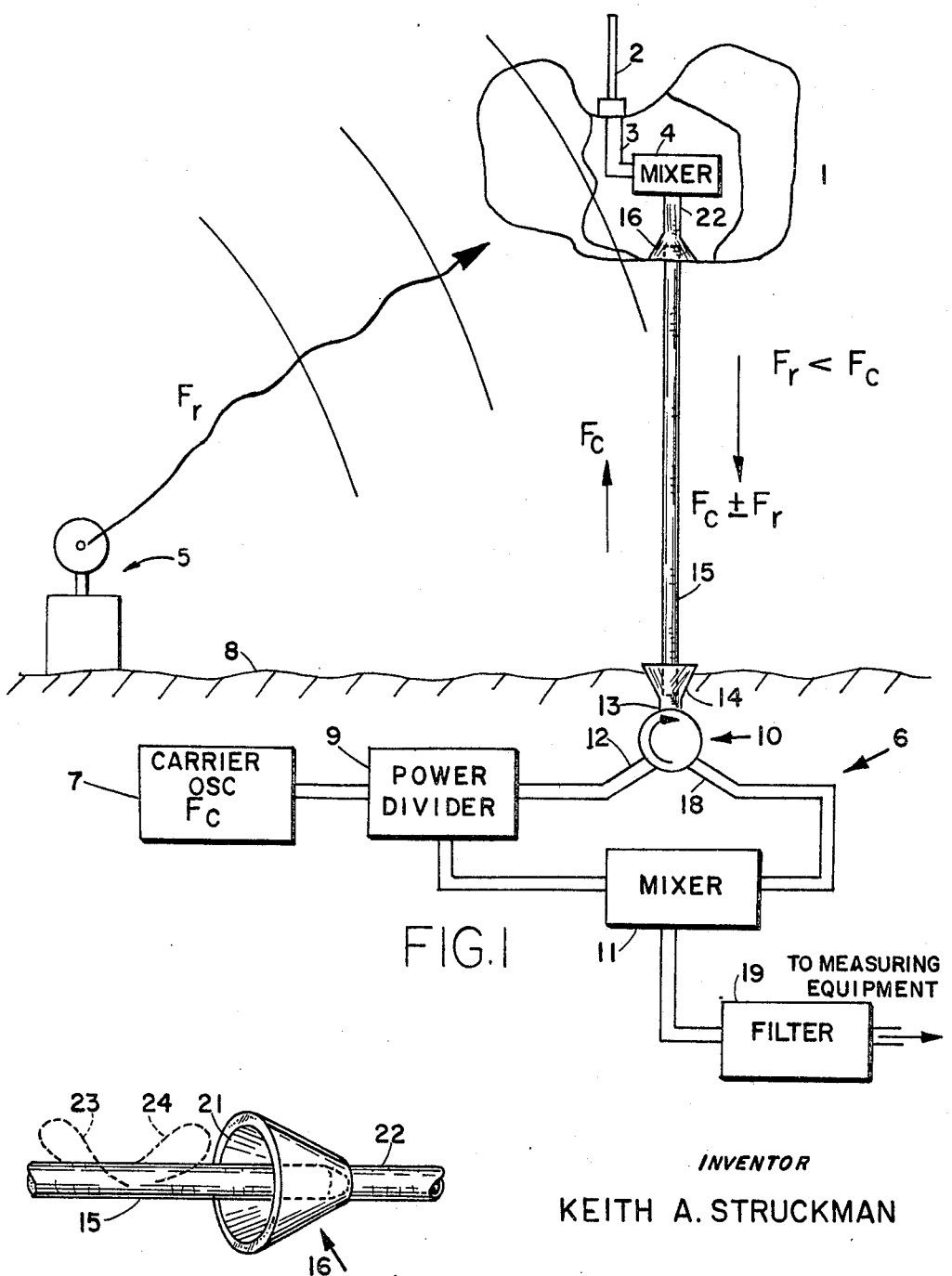

3,484,695
FIELD PERTURBATION REDUCTION IN ANTENNA PATTERN MEASURMENTS BY USE OF DIELECTRIC TRANSMISSION LINE
Keith A. Struckman, Brookline, N.H., assignor to Sanders Associates, Inc., Nashua, N.H., a corporation of Delaware
Filed Aug. 19, 1965, Ser. No. 481,040
Int. Cl. H04b 1/04
U.S. Cl. 325—67      4 Claims

ABSTRACT OF THE DISCLOSURE

There is herein disclosed a system for simulating an electromagnetic radiation pattern about a vehicle wherein a dielectric transmission line is used to couple signals received at a model of the vehicle to remote recording apparatus. The transmission line is of such construction and dimensions as to have negligible distorting effect upon the radiation pattern which is to be simulated.

---

The invention herein described was made in the course of a contact with the Department of the Navy.

This invention relates to systems for simulating the pattern of radio waves enveloping a flying or orbiting vehicle and more particularly to a closed communication circuit with a simulated vehicle causing negligible interference with radio frequency radiation patterns about the simulated vehicle.

In the course of development of a satellite vehicle, it is often required to perform a number of tests under controlled conditions to determine the pattern of radio frequency radiation enveloping the vehicle in communication with ground stations. Knowledge of the radiation pattern about the vehicle is useful when, for example, designing and locating antennas on the vehicle. When the vehicle is illuminated by radio waves from a ground station, all conductive parts of the vehicle react to the incident radio waves as passive radiating antennas and so they radiate and thereby complicate the radiation pattern of the vehicle's antenna. This usually adds to the problems involved in designing and locating the antenna on the vehicle, particularly, when the various dimensions of the vehicle are comparable with the wave length of the radio waves.

The cost and complexity of conducting full scale tests with the vehicle fully loaded with communicating equipment and suspended aloft in some manner is generally prohibitive. Accordingly, it has been the practice to fabricate a model of the vehicle, usually at a reduced scale, and to suspend this model above a ground plane and illuminate it with radio frequency signals of a correspondingly reduced wave length. Heretofore signals received by the antenna on the model have been transferred to remote recording equipment via conventional type transmission lines. As an alternative, small transmitters have been located in the model to transmit the detected radio signals to the remote recording equipment. Both of these techniques for transmitting the detected signals to the remote equipment have inherent problems. The conventional transmission lines, such as coaxial line, distort the radio wave radiation patterns in the vicinity of the model because such transmission lines act as reflectors and so a true analog of the actual vehicle is not obtained. The telemetry system obviously requires complex receiving and transmitting equipment in the model and accordingly increase the costs and difficulty of performing the tests.

It is one object of the present invention to provide means for simulating the radio wave reflective characteristics of a vehicle such as mentioned above and to transmit information revealing these characteristics from the simulator to a remote point without encountering the inherent problems of prior systems mentioned above.

It is another object to provide apparatus for simulating the radio wave radiation patterns in the vicinity of a vehicle and including means for transmitting signals between said simulating means and a remote station without substantially alterating said patterns.

It is another object to provide a closed circuit transmission system between a body and a remote station such that the transmission system does not play any significant part in the formation of radiation patterns in the vicinity of said body when said body is illuminated by radio waves.

In an embodiment of the present invention, a model of a vehicle so designed as to exhibit the same radiation and reflection characteristics to incident radio waves as the true vehicle is disposed above a ground plane beneath which is located recording equipment. A transmission line is provided between the recording equipment and the model for transmitting signals to and from the model. This transmission line consists of a dielectric rod or slab of selected dimensions and material so as to perform as a wave guide for signals transmitted between the model and the remote station. Since the dielectric is non-conductive, reflection from the transmission line is substantially non-existent. Distortion is minimized by making the transverse dimensions of the dielectric line a small fraction of a free space wavelength of the incident radio waves.

Other features and objects of the invention will be apparent from the following specific description taken in conjunction with the figures in which:

FIGURE 1 is a plan of the simulator system illustrating the relative orientation of the model of the vehicle, remote station, ground plane and dielectric transmission line; and FIGURE 2 is a view of a wave launching horn and dielectric transmission line to illustrate coupling therebetween.

As shown in FIGURE 1, a body 1 of nondescript shape represents the model of the vehicle. Details of structure and shape of the model are not important to the present invention and so they are not described. In fact, just about any vehicle configuration imaginable could be represented by a similarly shaped model and substituted for the body 1. Whatever may be the actual vehicle shape and function it will include at least one antenna means at a particular location and orientation on the vehicle. This antenna and its location and orientation is represented on the model by the antenna 2. The antenna is connected by a standard type transmission line 3 to a mixer disposed within the body 1. The mixer serves to mix radio frequency signals intercepted by the antenna, denoted $F_r$, with carrier oscillator frequency $F_c$ also fed to the mixer, producing the sideband frequencies $F_c \pm F_r$.

The carrier oscillator frequency $F_c$ is generated at the remote location 6 by a carrier oscillator 7, preferably situated below the ground plane 8. The power output from the carrier oscillator is divided by power divider 9 which feeds circulator 10 and mixer 11. The circulator directs this power from port 12 to port 13 which connects to a horn 14 coupled to the dielectric transmission line 15. Thus, the horn launches local oscillator frequency $F_c$ into one end of the dielectric transmission line. The transmission line 15 guides the carrier oscillator power to a similar horn 16 located within the body 1 and horn 16 feeds the signal $F_c$ to the mixer 4. Thus, the received radio frequency $F_r$ and local oscillator frequency $F_c$ are mixed producing sidebands $F_c \pm nF_r$, where $n=1$, 2, 3, . . . etc.

The sidebands $F_c \pm nF_r$ are launched from horn 16 into the dielectric transmission line 15 and conducted via horn 14 to port 13 of the circulator 10. The circulator directs the sideband energy from port 13 to port 18 from which the sideband energy is transmitted to mixer 11. In mixer 11, the sidebands are mixed with the carrier oscillator frequency $F_c$. A filter 19 in the output of mixer 11 attenuates all of the sidebands with the exception of the sideband $F_r$ which it transmits to measuring equipment. Thus, the radio frequency energy $F_r$ illuminating the body 1 from a distant source 5 is received by the antenna 2 in the model 1 and transmitted by dielectric transmission line 15 to the remote station 6 wherein the signal $F_r$ is extracted and measured.

The signal $F_r$ received by the antenna 2 is mixed with the higher carrier oscillator frequency $F_c$ before transmission via the dielectric transmission line so that the transverse dimensions of the dielectric transmission line may be relatively small compared to the wave length of the incident radio waves at frequency $F_r$. When the transverse dimensions of the dielectric transmission line are but a small fraction of a free space wavelength of the incident radio waves, distortion of the wave pattern is held to a minimum.

Radio frequency waves of a given frequency are guided without excessive losses by a dielectric transmission line of minimum diameter when propagation is in the lowest mode. The dipole mode is the lowest mode of propagation that normally occurs in a cylindrical dielectric transmission line. Waves conducted in the dipole mode propagate as a hybrid wave. That is to say, the wave has longitudinal components of both the electric and magnetic fields.

Propagation of waves in the dipole mode does not cut off at a specifically definable lower cut-off frequency. However, as the diameter of the rod is decreased a greater portion of the wave energy at the given frequency flows outside the dielectric rod and spreads. Thus, as the rod is made smaller it becomes less stable as a transmission line for the given frequency. In addition, any small curvature or turn in the dielectric rod will add appreciably to the loss. Accordingly, the diameter of the rod is preferably sufficiently large to transmit energy at the given frequency in the dipole mode without incurring excessive losses.

FIGURE 2 illustrates a rod shaped dielectric transmission line coupled to an electrically conductive horn which, in turn, connects directly to a conventional circular wave guide. The dielectric transmission line 15 is preferably tapered at the end so that it engages the inside tapered walls 21 of the horn 16, the pitch of the taper being the same as the conical angle of the horn. This provides a satisfactory impedance match between the dielectric transmission line 15 and the circular wave guide 22. The mouth of the horn is sufficiently large to intercept a substantial part of the wave energy which flows outside of the line 15. Typical field lines of the dipole mode which extend outside the dielectric transmission line 15 are represented by phantom lines 23 and 24.

In addition to the above considerations in determining the diameter or transverse dimensions of the dielectric transmission line 15, the diameter and the dielectric material are selected so that distortion of the wave pattern of the incident radio waves at frequency $F_r$ is maintained less than a prescribed level. One example of a satisfactory selection of dielectric material, rod diameter and carrier frequency $F_c$ for operation with $F_r = 150$ mc./s. is as follows:

Dielectric material: Rexolite ® 1422 or other plastic material having low dielectric loss at carrier frequency
Rod diameter: ⅝ inch
$F_c$: 9,000 mc./s.

When the transverse dimensions of the dielectric line are substantially less than the free space wave length of $F_r$, two benefits are gained. First, the radiation $F_r$ does not couple into the dielectric transmission line, and, second, the field pattern of the frequency $F_r$ in the vicinity of the transmission line and the body 1 is substantially undistorted by the presence of the dielectric transmission line. This contrasts sharply with distortion generated by conventional transmission lines such as coaxial cable and where, in addition, distortion is quite independent of transmission line dimensions.

This completes the description of an embodiment of the present invention providing a closed transmission path between a suspended model and a remote station such that the closed transmission path in no manner interferes with or distorts radiation patterns in the vicinity of the model of radio frequency energy illuminating the model. The embodiment described and details pertaining thereto are made by way of example and do not limit the spirit and scope of the invention as set forth in the accompanying claims.

I claim:

1. In a simulator for measuring the performance of the antenna system of a vehicle in a free space environment, a transmission system for conducting signals illuminating a model of the vehicle from the model to a remote station comprising a transmission line between said model and said remote station constructed substantially only of dielectric material along parts thereof which extend into said free space environment, means for generating a frequency signal at a frequency substantially greater than the frequency of said illuminating signal, means for coupling said generating means to said dielectric transmission line, whereby said greater frequency signal is guided by said transmission line to said model, means within said model for mixing said greater frequency signal with said illuminating frequency signal detected at said model producing sideband frequencies, whereby said sideband frequencies are guided by said transmission line from said model to said station.

2. In a vehicle simulator for measuring the performance of a vehicle antenna system in a free space environment, a transmission system for conducting signals illuminating a model of said vehicle to a remote station comprising a transmission line between said model and said remote station constructed only of dielectric material along parts thereof which extend into said free space environment, the cross section dimensions of said dielectric transmission line being less than a free space wavelength of the frequency of said illuminating signals, means for generating a frequency signal at a frequency substantially greater than said illuminating frequency signal, means for coupling said generating means to said dielectric transmission line, means at said model for mixing said greater frequency signal with said illuminating frequency signal producing sideband frequencies, means for conducting said sideband frequencies to said dielectric transmission line and means at said remote station for extracting said illuminating frequency from said sideband frequencies.

3. In a vehicle simulator for measuring the performance of the vehicle antenna system in a free space environment, a transmission system for conducting signals of electromagnetic radiation at radio frequency illuminating a model to a remote station comprising a transmission line between said model and said remote station constructed only of dielectric material along parts thereof which extend into said free space environment, the cross section dimensions of said dielectric transmission line being substatially less than a free space wavelength of said illuminating radio frequency, means for generating a frequency signal at a frequency substantially greater than said illuminating frequency, means for coupling said generating means to said dielectric transmission line, whereby said greater frequency signal is guided to said model, means at said model for mixing said greater frequency signal with said illuminating frequency signal producing sideband frequencies and for conducting said sideband frequencies to said dielectric transmission line, whereby said sideband frequencies are guided by said dielectric transmission line from said model to said remote station and means at said remote station for mixing said greater frequency with said sideband frequencies producing said illuminating frequency signal.

4. A device for simulating the radiation pattern of the antenna system of an orbital vehicle comprising a model of said orbital vehicle, an antenna carried by said model representing the antenna of said vehicle, said model being situated above a ground plane, a remote station situated on the opposite side of said ground plane from said model, means for illuminating said model with electromagnetic energy representative of radio frequency energy illuminating said vehicle, means for transmitting signals between said remote station and said model including means at said remote station for generating a carrier signal of substantially higher frequency than the frequency of said illuminating electromagnetic energy, a dielectric transmission line extending between said remote station and said model of said vehicle, the transverse dimensions of said transmission line being substantially less than a free space wavelength of said illuminating energy, and means for coupling said generating means to said dielectric transmission line.

References Cited

UNITED STATES PATENTS

| | | | |
|---|---|---|---|
| 3,241,145 | 3/1966 | Petrides | 325—115 X |
| 2,602,924 | 7/1952 | Schmitt et al. | 343—100 |
| 2,867,776 | 1/1959 | Wilkinson | 333—21 |
| 3,340,475 | 9/1967 | Anderson | 325—439 X |
| 3,274,597 | 9/1966 | Archer et al. | 343—703 X |

OTHER REFERENCES

Proceedings of the IRE; December 1947; pp. 1451–1462.

Journal of Applied Physics; December 1949; pp. 1188–1191.

ROBERT L. GRIFFIN, Primary Examiner

B. V. SAFOUREK, Assistant Examiner

U.S. Cl. X.R.

325—111; 333—21, 95; 343—703